United States Patent Office 3,434,884
Patented Mar. 25, 1969

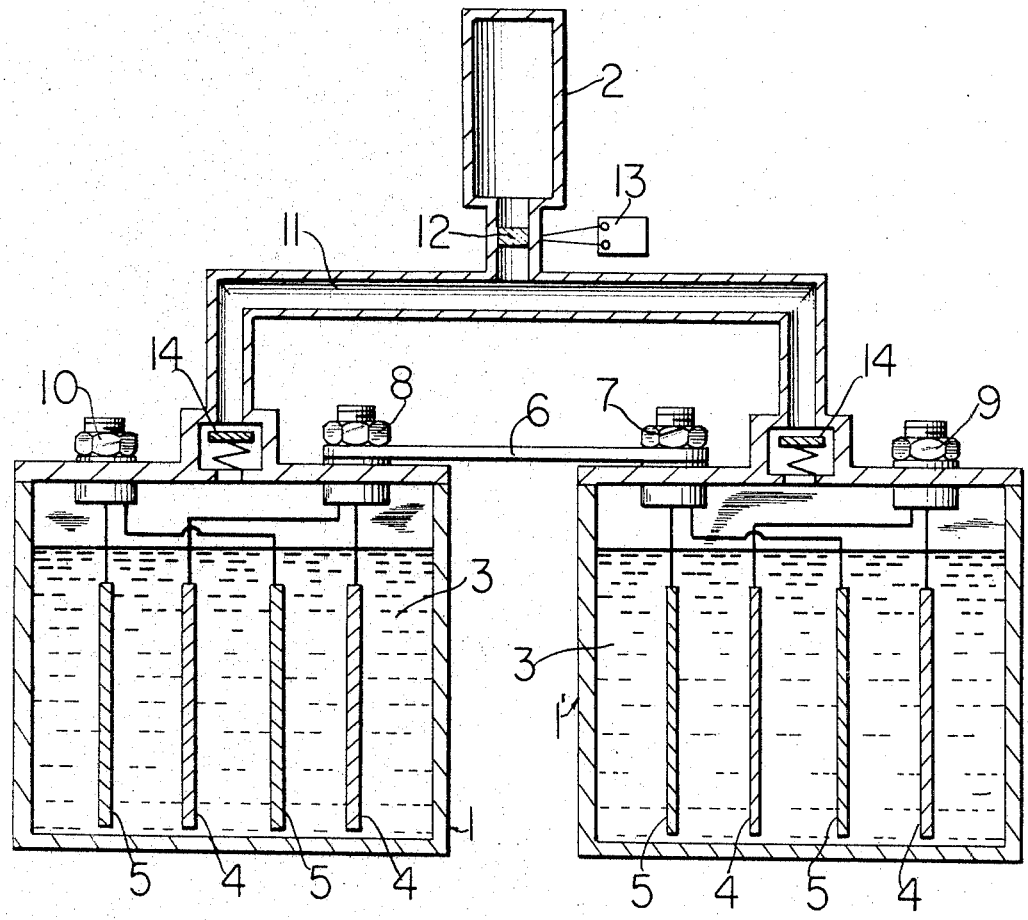

3,434,884
DEFERRED ACTION, GAS-ACTIVATED CELLS OR BATTERIES
Bernard Paul Louis Amiet, Vaucresson, France, assignor to Societe des Accumulateurs Fixes et de Traction (Societe Anonyme), Romainville, Seine-Saint-Denis, France, a company of France
Filed Apr. 22, 1966, Ser. No. 544,489
Claims priority, application France, May 12, 1965, 16,754
Int. Cl. H01m 27/28
U.S. Cl. 136—86
8 Claims

ABSTRACT OF THE DISCLOSURE

A deferred action electromotive power device comprising positive and negative electrodes carrying active material in solid state, an aqueous electrolyte selected from the group consisting of chromates and phosphates in which the electrodes are immersed, whose pH value initially is such that it has a passivating action on said electrodes and thus maintains the device in an inactive state, a source of compressed depassivating gas and means for introducing said gas into electrolyte for altering the pH value thereof and thereby depassivating the electrolyte and electrodes so that the device becomes active and operative by the altered electrolyte to conditions for use and remains in such active condition thereafter without requiring any further introduction of said gas. The introduced gas itself plays no part in the electrochemical reactions of the then-activated power device.

---

This invention relates to deferred action cells which are activated at the desired time of use as by introduction at that time of an activating gas, said cells being in inert condition for indefinite storage prior to their time of activation.

It is well known that the so-called deferred action batteries or cells are those which are activated at the moment of required use usually by a transfer of electrolyte which then floods the electrodes and their separators. The electrolyte, which is initially stored in containers annexed to the cells or batteries proper must be introduced in the said battery at the desired moment of activation.

Such batteries or cells are subject to some drawbacks among which may be mentioned the difficulty of transferring the electrolyte, and also their insufficient energies per unit of volume and per unit of mass.

The art has attempted to remedy these drawbacks by providing other types of deferred action batteries or cells in which the electrolyte is initially placed between the electrodes, in an inert, solid state, the desired activation of the battery or cell for use being obtained by melting the electrolyte at such time. However, this arrangement and method requires maintenance of a relatively high operating temperature and the discharge time is shortened when cooling occurs.

In another type of battery or cell, the electrolyte is initially placed between the electrodes in state of a solid crystallized salt which in such condition is inert. This salt can become deliquescent and active as an electrolyte as a consequence of the introduction of a suitable gas into the cell, such introduction being effected at the desired time of activation.

Objects and features of this invention are the provision of deferred action batteries or cells that may be activated for use by a transfer of a depassivating gas into a cell or cells containing an aqueous electrolyte in a passivating state which may be used in a large range of applications and in a general way in the range until now solely using batteries or cells that become activated by a transfer of liquid electrolyte into contact with the electrodes.

A battery or cell according to this invention is more especially noteworthy in that before its use the electrodes are immersed in an aqueous passivating liquid electrolyte solution in which they are and remain in a passive state until at the desired moment of activation a separately maintained activating gas is transferred to them. This transferred gas changes the passive state by depassivating the electrodes, and as a result, the cell or battery is placed immediately in normal operating conditions.

Usually, the transfer gas used for this purpose is a gas which changes the pH of a passivating immersing solution, the well-known electrode passivation phenomenon thereof being related to the pH of the said solution.

This gas may, for example, be hydrochloric acid gas (HCl), or chlorine $Cl_2$ (and in this latter case the immersing solution should preferably comprise an organic compound such as ethyl alcohol with which the chlorine will react and yield hydrochloric acid) or ammonia.

The said passivating immersing solution will advantageously be, for example, an aqueous solution of an alkaline chromate, such as lithium chromate which is preferred because of its solubility, a phosphate such as a monometallic orthophosphate of a divalent metal such as manganese, e.g., $Mn(H_2PO_4)_2 \cdot H_2O$ or a mixture of the latter. In the case of lithium chromate, the concentration is approximately 100 gm. of the latter for 100 cm.$^3$ of water. In the case of phosphates which are feebly soluble, the solutions are approximately saturated ones in water. The anode will preferably be of a metal such as zinc, aluminum, lead or magnesium, and the cathode may be made of silver, copper, nickel, platinum-plated metal, carbon, etc. The cathode also may be of silver oxide or silver chloride.

The principle of the invention is immediately apparent from what has been said.

Supposing, for instance, that the initial electrode immersing passivating solution is an aqueous solution of a chromate presenting an alkaline reaction that may have a pH value as high as 9 or 10, or, in the case of phosphates presenting an acidic reaction in which, depending upon concentration of their solutions, the pH may range from 1 to 2 or even less and in which zinc and carbon electrodes are immersed. The conditions then are such that the electrodes are quickly passivated by formation of passivation layers thereon by such solutions and they can then remain unchanged and passive for a very long time. But if hydrochloric acid gas is introduced into such immersing solution (which gas is very quickly absorbed by the said solution) they become acidified, and the pH of the aqueous immersing solution being very quickly changed to an acid negative value, the passivation layers which have coated and protected the electrodes are destroyed. In such circumstances, the cell or the battery is immediately put in operating condition. In the case where ammonia is used as the depassivating agent, on the contrary, the pH of the solution has a tendency to increase and in numerous cases the destruction of the passivating layers is due to the formation of soluble ammoniacal complexes.

In the annexed drawing, given only as an example, the single figure shows an embodiment of a deferred action cell embodying the invention.

In this drawing, two batteries 1 and 1' are shown, these batteries being located close to each other and, therefore, capable of being activated by means of a single gas cylinder 2, containing, e.g., hydrochloric acid gas, or chlorine gas, either in compressed or in liquid state. In this example, the passivating electrolyte 3 in each battery originally consists of an aqueous solution of a chromate, preferably lithium chromate or of a phosphate such as manganese orthophosphate at the concentrations noted above. If the gas is chlorine, an organic compound such as ethyl alcohol that reacts with chlorine to produce hydrochloric acid is included in this electrolyte. The anodes 4 are of zinc, whereas the cathodes 5 are of carbon. The respective anodes 4 and 5 are connected to the respective pairs of terminals 8, 9 and 7, 10 and the two batteries 1 are series connected by means of a connecting conduit or plate 6 joining the terminals 7 and 8 of opposite polarity in the batteries 1 and 1' which thus are linked together. The electrical circuit is closed through the respective negative and positive output terminals 9 and 10 of the unit formed from said two batteries 1 and 1',.

In such conditions, the electrodes 4 and 5 of each battery are passivated in the passivated electrolyte solution by formation of passivating layers on said electrodes.

A pipe 11 connects the single hydrochloric acid or chlorine gas containing cylinder 2 to both batteries 1. The connection between pipe 11 and cylinder 2 is normally closed by a frangible stopper 12, e.g., of glass or other suitable plugging means, e.g., a valve (not shown) for gas cylinder 2. A device 13, e.g., of an electrical nature, which is diagrammatically shown, for igniting a squib (not shown) for destroying the stopper 12 or for operating the valve is provided. Two one-way valves 14 prevent solution 3 from flowing in pipe 11 and into cylinder 2.

When the batteries are to be activated, the stopper 12 is destroyed by electrical means 13 or manually or the valve is opened thereby. The compressed hydrochloric acid or chlorine gas contained in cylinder 2 then flows quickly through pipe 11 passing one-way valves 14 and enters batteries 1 and 1'. It is immediately absorbed by the passivating alkaline electrolyte solution therein, changing the pH of the latter to a strongly negative acid condition and thus transforming it into an active electrolyte and depolarizer and depassivating the electrodes and destroying the passivating layers thereon. The battery is then ready for immediate use.

The batteries according to the invention are particularly advantageous because of the small volume and weight of gas required for activation and to the particularly simple mode of its transfer to the electrolyte containing compartments of the batteries or cells.

Numerous changes may be made in the embodiments of the invention. Thus, the same gas-storing means can be used for activation of a single battery or cell or for simultaneous or successive activation of several batteries by means of interconnecting pipes and suitable manifolds.

It is to be understood that other variations within the scope of the appended claims are possible and are contemplated. There is no intention, therefor, of limitation to the exact embodiments described and shown which have been presented merely as examples.

What is claimed is:

1. A deferred action electromotive power device comprising positive and negative electrodes, an aqueous electrolyte selected from the group consisting of chromates having a pH value ranging up to approximately 9 to 10 and phosphates having a pH value ranging up to approximately 2 in which said electrodes are immersed, and which has a passivating action on said electrodes, a source of compressed depassivating gas and means for introducing said gas into the electrolyte for activating the latter and depassivating the electrolyte and said electrodes and placing said device in active condition for use, without requiring continuation of gas supply thereafter to use said device.

2. A deferred action electromotive power device according to claim 1, wherein said gas is selected from the group consisting of hydrochloric acid gas, chlorine gas and ammonia and wherein the aqueous solution also includes an organic compound when the selected gas is chlorine that reacts with the latter to produce hydrochloric acid.

3. A deferred action electromotive power device according to claim 1, wherein said chromate is an aqueous solution of lithium chromate and said phosphate is an aqueous solution of manganese orthophosphate.

4. A deferred action electromotive power device according to claim 1 wherein when said selected gas is ammonia the pH value of the solution is elevated.

5. A deferred action electromotive power device according to claim 1 wherein the pH value of the solution is lowered when the selected gas is hydrochloric acid or chlorine.

6. A deferred action electromotive device according to claim 1, wherein said negative electrode is selected from the group consisting of zinc, aluminum, lead and magnesium and said positive electrode is selected from the group consisting of silver, silver oxide, silver chloride, nickel, platinum and carbon.

7. A deferred action electromotive device according to claim 1, wherein a plurality of said positive and negative electrodes are interconnected to form inter-connected cells, a separate casing for each cell, a pressure cylinder containing said gas, means connecting said cylinder with each cell, and frangible means normally blocking introduction of gas from said cylinder to each cell.

8. A deferred action electromotive device according to claim 7, including valve means for preventing flow of electrolyte from said cells into said gas cylinder.

References Cited
UNITED STATES PATENTS

| | | | |
|---|---|---|---|
| 2,615,931 | 10/1952 | Hatfield | 136—86 |
| 2,921,110 | 1/1960 | Crowley et al. | 136—86 |
| 2,914,595 | 11/1959 | Darland et al. | 136—86 |
| 2,948,767 | 8/1960 | Johnson et al. | 136—90 |
| 3,215,562 | 11/1965 | Hindin | 136—86 |
| 3,235,408 | 2/1966 | Harris | 136—90 |
| 3,297,487 | 1/1967 | Pomeroy et al. | 136—86 |

A. B. CURTIS, *Primary Examiner.*

A. SKAPARS, *Assistant Examiner.*

U.S. Cl. X.R.
136—90, 100